L. B. BECKER.
EYEGLASSES.
APPLICATION FILED JAN. 12, 1911.

1,002,627.

Patented Sept. 5, 1911.

WITNESSES

INVENTOR
Louis B. Becker
BY
ATTORNEYS

UNITED STATES PATENT OFFICE.

LOUIS B. BECKER, OF NEW YORK, N. Y.

EYEGLASSES.

1,002,627.  Specification of Letters Patent.  Patented Sept. 5, 1911.

Application filed January 12, 1911. Serial No. 602,145.

*To all whom it may concern:*

Be it known that I, LOUIS B. BECKER, a citizen of the United States, and a resident of the city of New York, borough of Manhattan, in the county and State of New York, have invented new and Improved Eyeglasses, of which the following is a full, clear, and exact description.

The object of the invention is to provide certain new and useful improvements in eyeglasses, whereby the pivoted nose clips can be readily placed in position on their supporting studs or removed therefrom and interchanged with a view to locate the nose clips nearer to or farther from the bridge as required or desired by the user.

For the purpose mentioned each nose clip is provided with an eye adapted to engage a stud formed on a bracket carried by the bridge, the bracket having a spring arm extending over the ends of the stud to hold the eye normally against displacement from the stud, the spring arm when bent to one side permitting convenient removal of the nose clip from the stud.

A practical embodiment of the invention is represented in the accompanying drawings forming a part of this specification, in which similar characters of reference indicate corresponding parts in all the views.

Figure 1:
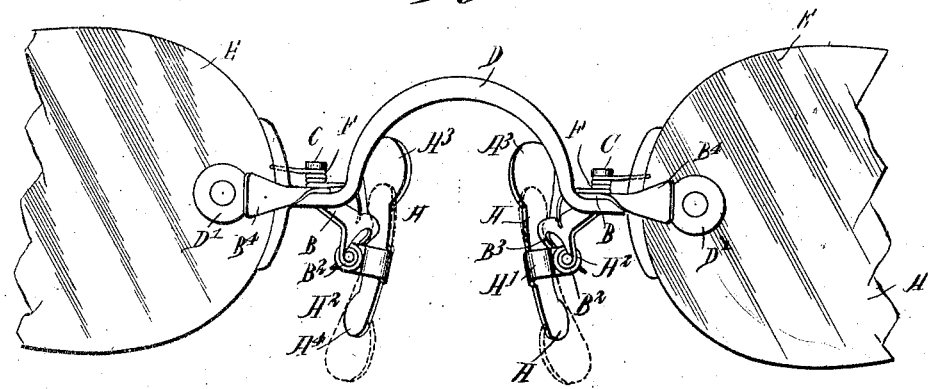
Figure 2:
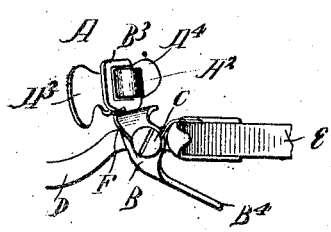
Figure 3:
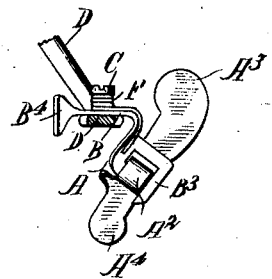
Figure 4:
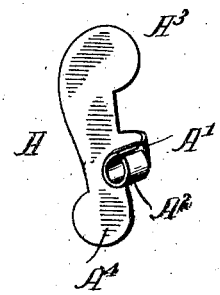

Figure 1 is a front elevation of eyeglasses having a rigid bridge and provided with the improved nose clips; Fig. 2 is a plan view of part of the same; Fig. 3 is a cross section of the same; Fig. 4 is a perspective view of one of the nose clips; and Fig. 5 is a face view of one of the brackets used on eyeglasses having spring bows.

The nose clips A, as illustrated in Figs. 1, 2 and 3, are mounted on brackets B in the form of levers fulcrumed on studs C secured to the top of the terminals D' of the rigid bridge D carrying lenses E in the usual manner, the lenses being secured on the terminals D' of the bridge D. In case the bridge is in the form of a spring bow then use is made of a fixed bracket B' (see Fig. 5) instead of the lever bracket B above mentioned. Each of the nose clips A is provided with an integral return bent flange A' terminating in an eye A² engaging a stud B², formed integrally on the inner end of the corresponding bracket B, and the said inner end of the bracket B is provided with an integral spring arm B³ extending across the outer ends of the eye A² and the stud B² to hold the eye A² against accidental disengagement from the stud B².

Each of the nose clips A is provided with terminals A³, A⁴ curved in opposite directions, with the eyes A² located nearer the terminal A⁴, as plainly indicated in the drawings. On bending the spring arm B³ to one side, the nose clip A can be readily removed from the stud B², and the nose clips A can be interchanged on the studs B² so as to bring the clips A in either of the two positions, that is, clampingly engaging the nose of the user. By locating the eye A² nearer the end A⁴ it is evident that when the nose clips are in position, with the clips A in clamping engagement with the nose, then the eyeglasses are held nearer the eyes than when the nose clips are reversed and the clips A clampingly engage the nose of the user. The brackets B are pressed on by springs F coiled on the studs C and having one terminal pressing against the inner end of the bracket B so as to engage the nose clips A with the desired force with the sides of the nose, the other terminals of the springs F resting against the terminals D' of the bridge D. The brackets B are also provided with finger pieces B⁴ adapted to be taken hold of by the operator for imparting a swinging motion to the brackets B with a view to properly engage the clips A with the nose when placing the eyeglasses in position or for conveniently removing the eyeglasses from the nose whenever it is desired to do so.

Figure 5:
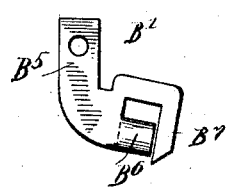

The bracket B' shown in Fig. 5 is provided with a shank B⁵ fastened in position on the post of the eyeglasses with the same screw that is used for fastening the terminal of the spring bow to the post, and the said bracket B' is provided with the stud B⁶ and the spring arm B⁷ similar to the stud B² and the spring arm B³ above referred to.

It is understood that in either case the nose clip is mounted to swing on the stud of the bracket and is held against displacement thereon by the corresponding spring arm B³ or B⁷, and which spring arm can be bent to one side for engaging the eye A² with the stud B⁶ or removing the eye from the stud as above explained.

Having thus described my invention, I claim as new and desire to secure by Letters Patent:

1. An eyeglass mounting having a bridge, brackets held on the said bridge and provided with studs, and spring arms extending over the ends of the studs, and nose clips having eyes for removably engaging the said studs and held against displacement by the said spring arms.

2. An eyeglass mounting having a bridge, brackets held on the said bridge and provided with studs, and spring arms extending over the ends of the studs, and nose clips having their terminals extending in opposite directions, and eyes on the said nose clips intermediate the said terminals, the said eyes removably engaging the said studs and held against displacement by the said spring arms.

3. An eyeglass mounting having a bridge, spring-pressed brackets pivoted on the said bridge and each having one end terminating in a finger piece, the other end having a stud and a spring arm extending across the end of the stud, and nose clips having their terminals curved in opposite directions and eyes on the said nose clips intermediate the terminals and near one of the terminals, the said eyes removably engaging the said bracket studs and held against displacement by the said spring arms.

4. An eyeglass mounting having a bridge, brackets on the bridge and provided with studs, and nose clips having eyes for removable and interchangeable engagement with the said studs, the terminals of the clips being curved in opposite directions relative to the said eyes.

In testimony whereof I have signed my name to this specification in the presence of two subscribing witnesses.

LOUIS B. BECKER.

Witnesses:
CHARLES POSNER,
S. H. EWD. FRITZ.